United States Patent
Arastafar (10) Patent No.: US 11,082,384 B2
(45) Date of Patent: *Aug. 3, 2021

(54) METHOD AND SYSTEM FOR PROVIDING NOTIFICATION

(71) Applicant: RingCentral, Inc., Belmont, CA (US)

(72) Inventor: Martin Arastafar, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,833

(22) Filed: Nov. 20, 2019

(65) Prior Publication Data

US 2020/0092246 A1 Mar. 19, 2020

Related U.S. Application Data

(63) Continuation of application No. 15/857,300, filed on Dec. 28, 2017, now Pat. No. 10,523,617.

(51) Int. Cl.
*H04L 12/58* (2006.01)
*H04L 29/06* (2006.01)

(52) U.S. Cl.
CPC .............. *H04L 51/24* (2013.01); *H04L 51/00* (2013.01); *H04L 51/36* (2013.01); *H04L 65/1083* (2013.01); *H04L 65/40* (2013.01); *H04L 65/403* (2013.01); *H04L 65/4023* (2013.01)

(58) Field of Classification Search
CPC .......... G06Q 10/109; G06Q 10/063116; H04L 67/22; H04L 67/24
See application file for complete search history.

(56) References Cited

U.S. PATENT DOCUMENTS

| | | | |
|---|---|---|---|
| 8,849,907 B1 | 9/2014 | Hession et al. | |
| 9,253,135 B2 | 2/2016 | Nowakowski et al. | |
| 9,881,282 B1 | 1/2018 | Narayanaswamy | |
| 2007/0106724 A1 | 5/2007 | Gortl et al. | |
| 2009/0214034 A1 | 8/2009 | Mehrotra et al. | |
| 2011/0060591 A1 | 3/2011 | Chanvez et al. | |
| 2012/0170734 A1* | 7/2012 | O'Sullivan | H04M 3/565 379/202.01 |
| 2013/0212494 A1 | 8/2013 | Heiferman et al. | |
| 2013/0268839 A1 | 10/2013 | Lefebvre et al. | |
| 2015/0089387 A1 | 3/2015 | Cili | |
| 2016/0364368 A1 | 12/2016 | Chen et al. | |

* cited by examiner

*Primary Examiner* — Chirag R Patel
(74) *Attorney, Agent, or Firm* — Finnegan, Henderson, Farabow, Garrett & Dunner, LLP (57) ABSTRACT

A system for providing a notification for a plurality of messages is disclosed. The system may include a memory and at least one processor. The at least one processor may be configured to receive the plurality of messages from one or more devices associated with one or more users; identify one or more subjects associated with the plurality of messages; and provide the notification including the plurality of messages to a device associated with a recipient, wherein the plurality of messages are arranged in the notification based on the identified one or more subjects, and wherein the one or more users and the recipient exchange the plurality of messages in a collaborative environment.

17 Claims, 6 Drawing Sheets

METHOD AND SYSTEM FOR PROVIDING NOTIFICATION

CROSS-REFERENCE TO RELATED APPLICATION

This application is a continuation of U.S. application Ser. No. 15/857,300, filed Dec. 28, 2017, which is incorporated herein by reference in its entirety.

TECHNICAL FIELD

The present disclosure relates to the field of communication systems and, more particularly, methods and systems for providing notifications in a collaborative environment.

BACKGROUND

In a collaborative communication environment, a group of participants may use user devices to engage in communications, such as instant messaging (IM), chat, email, voice over IP (VoIP) phone call, audio or video conferencing. Participants of a communication group often discuss a variety of different subjects in a communication session. When a user is not logged onto the collaborative environment or not actively participating in a communications session, notifications may be sent to the user's devices notifying the latest messages received. For example, the notification may include indications or snippets of the latest messages and the indications may be arranged in a sequence based on the time the corresponding messages are received.

SUMMARY

In one disclosed embodiment, a system for providing a notification for a plurality of messages is disclosed. The system comprises a memory and at least one processor. The processor is configured to receive the plurality of messages from one or more devices associated with one or more users; identify one or more subjects associated with the plurality of messages; and provide the notification including the plurality of messages to a device associated with a recipient. The plurality of messages may be arranged in the notification based on the identified one or more subjects. The one or more users and the recipient exchange the plurality of messages in a collaborative environment.

In another disclosed embodiment, a computer-implemented method for providing a notification for a plurality of messages is disclosed. The computer-implemented method comprises receiving the plurality of messages from one or more devices associated with one or more users; identifying one or more subjects associated with the plurality of messages; arranging the plurality of messages in the notification based on the identified one or more subjects; and providing the notification to a device associated with a recipient, wherein the one or more users and the recipient exchange the plurality of messages in a collaborative environment.

In another disclosed embodiment, a non-transitory computer readable medium is disclosed. The non-transitory computer readable medium stores a set of instructions that is executable by at least one processor of a server to cause the server to perform a method for providing a notification for a plurality of messages. The method comprises receiving the plurality of messages from one or more devices associated with one or more users; identifying one or more subjects associated with the plurality of messages; and providing the notification including the plurality of messages to a device associated with a recipient, wherein the plurality of messages are arranged in the notification based on the identified one or more subjects, and wherein the one or more users and the recipient exchange the plurality of messages in a collaborative environment.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Reference will now be made in detail to the example embodiments implemented according to the present disclosure, the examples of which are illustrated in the accompanying drawings. Wherever possible, the same reference numbers will be used throughout the drawings to refer to the same or like parts.

Collaborative communication environments provide participants with the ability to engage in communications, such as instant messaging (IM), chat, email, voice over IP (VoIP) phone call, audio or video conferencing. Participants of a communication group in a collaborative environment may exchange messages and discuss multiple subjects in a communication session. The messages may contain text, audio, video, data, or any other multimedia content.

When a user is not logged onto the collaborative environment or when a user is not participating in exchanging messages in a communications session in a collaborative environment, notifications are sent to the user's device(s) notifying the user of the presence of new messages in the collaborative environment. Such notifications often include one or more indications or snippets of the latest messages that are bundled in a notification in order to alert the user of the content of the messages exchanged. Users in a communications session of a collaborative environment often exchange messages relating to different topics. When several different subjects are discussed in the messages of the notification, it becomes difficult for a user to identify what subject each message is relating to and to understand the context of the messages. If a user seeks to find messages relating to a particular subject, the user may need to manually sift through all the indications or snippets in the notification one by one. Not only this is cumbersome as the user has to often review several notifications in order to determine messages relating to a desired subject, but also the user may be unable to gain access to the full content of the exchanged messages since the notifications or snippets may not contain the messages in their entirety.

Moreover, the notification generally includes only messages discussed by participants of a communication group that the user is a member of. The user may not be able to view messages discussed outside of the communication group relating to a particular subject in the notification, such as messages discussed by a different communication group that the user is not a member of. Further, the notification may include an action item for the user to act on, such as a task assignment, and when the notification includes a number of messages, the action item may be unnoticed by the user and thereby delaying the completion of the task.

Thus, notifications that provide context of the messages and allow the user to easily appreciate the subject of each message are desired. It is also desired that the notification provides the capability to remind the user of an action item in a collaborative environment and to display messages that may be of interest to the user.

Example embodiments of the present disclosure provide methods and systems for providing a notification for a plurality of messages in a collaborative environment. Consistent with disclosed embodiments, a communications server may receive the plurality of messages from one or more devices associated with one or more users, where the one or more users may exchange the plurality of messages in a collaborative environment. The communications server may identify one or more subjects associated with the plurality of messages and provide the notification including the plurality of messages to a device associated with a recipient. The plurality of messages may be arranged in the notification based on the identified one or more subjects.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

Figure 1:
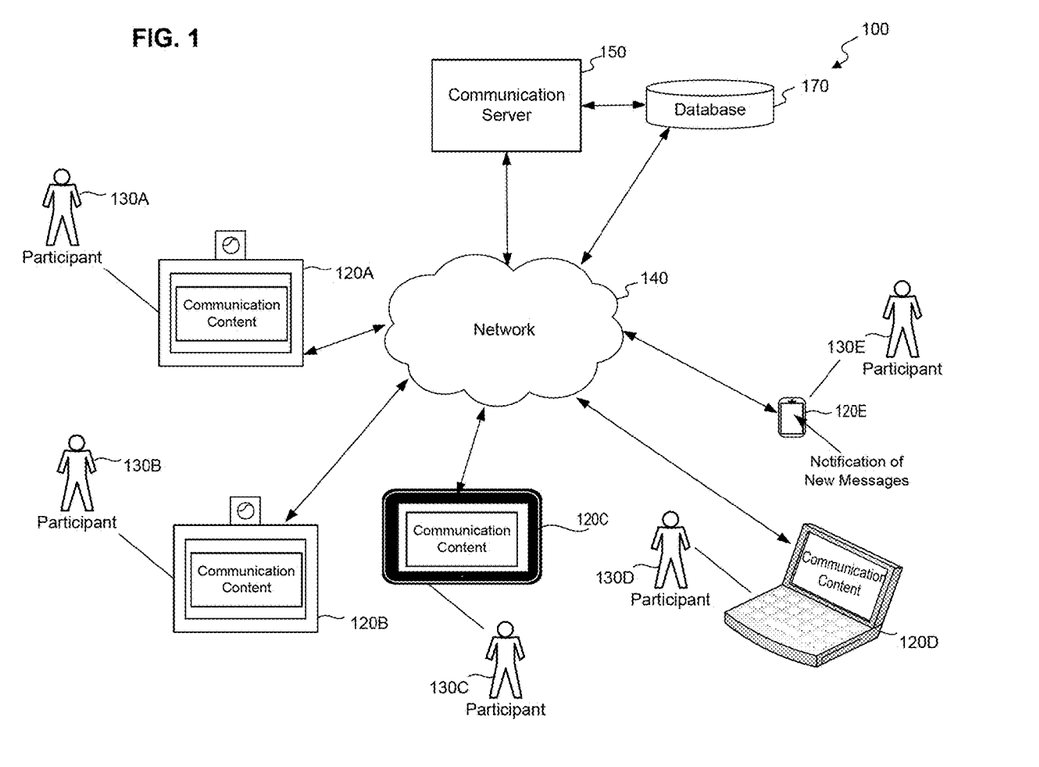
FIG. 1 is a diagram of an example of a collaborative communication system in which various implementations described herein are practiced.

FIG. 1 shows an example of a collaborative communication system 100 in which various implementations as described herein are practiced. Collaborative communication system 100 enables a plurality of users to exchange messages with one another via the associated user devices and to receive notifications of new messages when the user is not logged onto the collaborative communication system. In some examples, one or more components of collaborative communication system 100, such as communication server 150, can be used to implement computer programs, applications, methods, processes, or other software to perform the described techniques and to realize the structures described herein.

As shown in FIG. 1, collaborative communication system 100 includes one or more user devices 120A-120E (collectively as user devices 120), a network 140, a communication server 150, and a database 170. Collaborative communication system 100 is a collaborative environment that allows a group of participants (e.g., one or more participants 130A-130E) using associated user devices (e.g., one or more user devices 120A-120E) to engage in communications, such as instant messaging (IM), chat, email, voice over IP (VoIP) phone call, audio or video conferencing, etc., as well as sharing communication content associated with the collaboration such as data files, documents, images, audio/video content, etc. The components and arrangements shown in FIG. 1 are not intended to limit the disclosed embodiments, as the system components used to implement the disclosed processes and features can vary.

The network 140 facilitates communications and sharing of content between the user devices 120 and the communication server 150. Although shown as separate from network 140, in some embodiments, server 150 may be included within network 140. The network 140 may be any type of networks that provides communications, exchanges information, and/or facilitates the exchange of information between the communication server 150 and user devices 120. For example, the network 140 may be the Internet, a Local Area Network, a cellular network, a public switched telephone network ("PSTN"), or other suitable connection(s) that enables collaborative communication system 100 to send and receive information between the components of collaborative communication system 100. A network may support a variety of messaging formats, and may further support a variety of services and applications for user devices 120.

The communication server 150 may be a system associated with a communication service provider which provides messaging services to users, such as participants 130A-130E. The communication server 150 may also be configured to provide other data or services, such as voice, messaging, real-time audio/video, to the users. The communication server 150 may be a computer-based system including computer system components, desktop computers, workstations, tablets, hand held computing devices, memory devices, and/or internal network(s) connecting the components. The communication server 150 may be configured to receive messaging information from user devices 120 over the network 140, process the messaging information, store the messaging information, and/or transmit messaging information to the user devices 120 over the network 140.

For example, participants 130A-130E (collectively as participants 130) may belong to a communication group and exchange information between members of the communication group. Participants 130A-130D are logged onto the collaborative communication system, while participant 130E is currently offline. The communication server 150 is configured to receive a plurality of messages sent by participants 130A-130D through user devices 120A-120D, identify one or more subjects associated with the plurality of messages, and provide the notification including the plurality of messages to user device 120E associated with participant 130E, where the plurality of messages are arranged in the notification based on the identified one or more subjects. The user device 120E may display the notification according to the subject designated to each message. The communication server 150 may maintain and manage a plurality of communication groups simultaneously. The communication server 150 may also be configured to maintain a list of participants for each communication group. In some implementations, the functionality of the communication server 150 described in the present disclosure is distributed among one or more of the user devices 120A-120E. For example, a part or all of the messages in a communication session may be stored in one or more of the user devices 120, and one or more of the user devices 120A-120E may perform functions such as analyzing the messages in a communication session to differentiate multiple subjects in the messages, and designating a subject to each of the message in the communication session.

The database 170 includes one or more physical or virtual storages coupled with the communication server 150. The database 170 utilizes one or more storage mechanisms based on any tangible and/or non-transitory storage or memory. Further, the database 170 may store the data in a variety of formats. For example, the database 170 may be an object-relational database, a non-relational database, a full-text indexed data storage, and/or other database system. The database 170 is configured to store messages exchanged in a communication session. The database 170 may also be adapted to store a plurality of subjects reflected in the messages exchanged between participants 130. The data stored in the database 170 may be transmitted to the communication server 150 before or during an ongoing communication session. In some embodiments, the database 170 is stored in a cloud-based server (not shown) that is accessible by or separate from the communication server 150 and/or the user devices 120 through the network 140. While the database 170 is illustrated as an external device connected to the communication server 150, the database 170 may also reside within the communication server 150 as an internal component of the communication server 150.

As shown in FIG. 1, participants 130A-130E of a communication group send and/or exchange messages with one another using various types of user devices 120A-120E in a communication session. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E include mobile devices such as a tablet or a smartphone having display and video/audio capture capabilities. User devices 120A-120E may also include one or more software applications that facilitate the user devices to engage in communications, such as IM, VoIP, video conferences, with one another in a group messaging environment where each participant may view contents of messages posted by other participants in a communication group and may post messages that can be accessed by other participants in the communication group. Although FIG. 1 shows one user device associated with each participant, there may be more than one user device associated with a participant.

Figure 2:
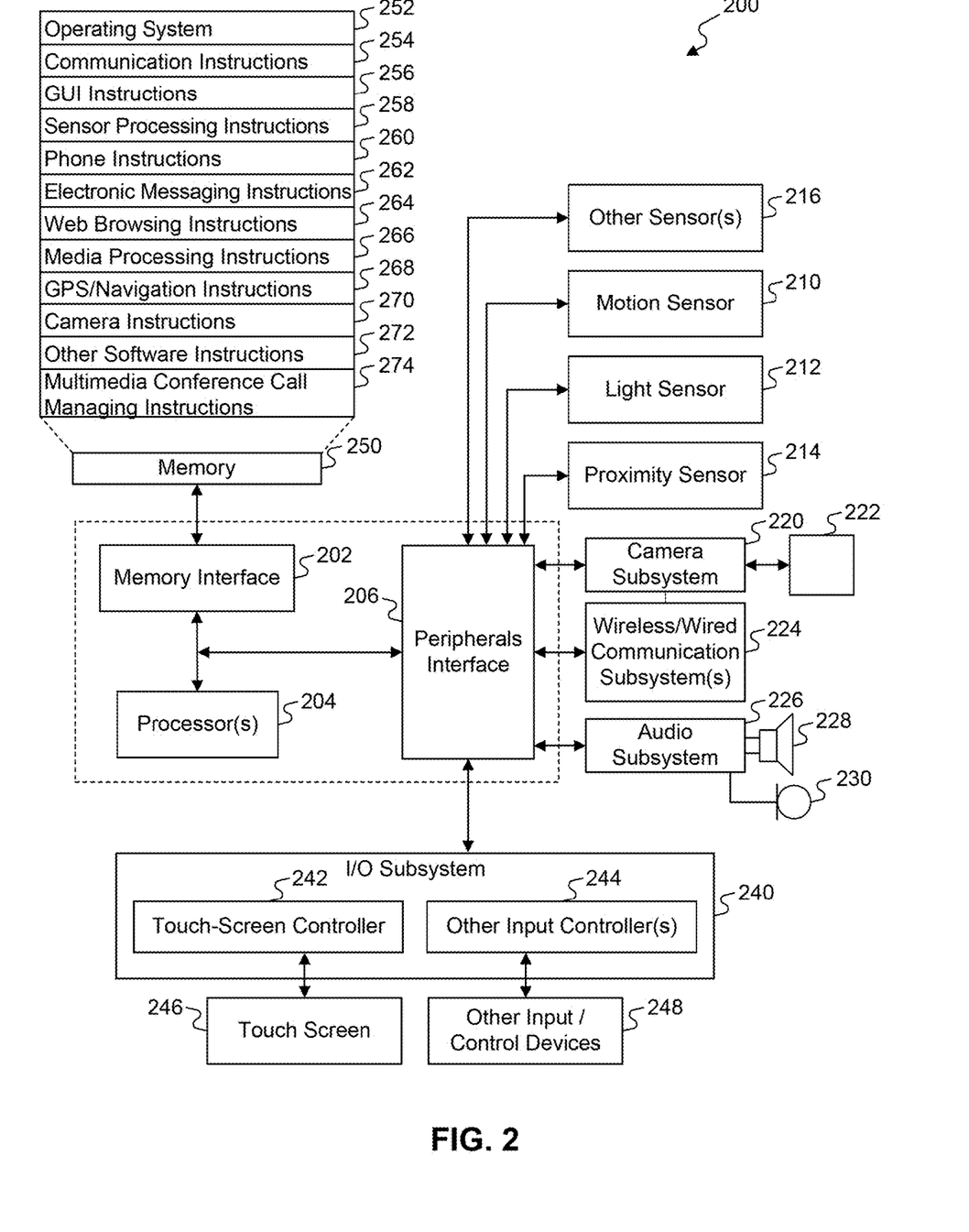
FIG. 2 is a diagram of an example user device for implementing embodiments consistent with the present disclosure.

FIG. 2 is a diagram of an example of a user device 200 for use in a collaborative communication system, such as collaborative communication system 100. The user device 200 can be used to implement computer programs, applications, methods, processes, or other software to perform embodiments described in the present disclosure, such as the user devices 120A-120E. The user device 200 includes a memory interface 202, one or more processors 204 such as data processors, image processors and/or central processing units, and a peripherals interface 206. The memory interface 202, the one or more processors 204, and/or the peripherals interface 206 can be separate components or can be integrated in one or more integrated circuits. The various components in the user device 200 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a global positioning system (e.g., GPS receiver), a temperature sensor, a biometric sensor, or other sensing device, to facilitate related functionalities. A GPS receiver can be integrated with, or connected to, the user device 200. For example, a GPS receiver can be built into mobile telephones, such as smartphone devices. GPS software allows mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 224, which includes a Ethernet port, radio frequency receivers and transmitters and/or optical (e.g., infrared) receivers and transmitters. The specific design and implementation of the wireless/wired communication subsystem 224 depends on the communication network(s) over which the user device 200 is intended to operate. For example, in some embodiments, the user device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

The I/O subsystem 240 includes a touch screen controller 242 and/or other input controller(s) 244. The touch screen controller 242 is coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. While a touch screen 246 is shown in FIG. 2, the I/O subsystem 240 may include a display screen (e.g., CRT or LCD) in place of the touch screen 246.

The other input controller(s) 244 is coupled to other input/control devices 248, such as one or more buttons, rocker switches, thumb-wheel, infrared port, USB port, and/or a pointer device such as a stylus. The touch screen 246 can, for example, also be used to implement virtual or soft buttons and/or a keyboard.

The memory interface 202 is coupled to memory 250. The memory 250 includes high-speed random access memory and/or non-volatile memory, such as one or more magnetic disk storage devices, one or more optical storage devices, and/or flash memory (e.g., NAND, NOR). The memory 250 stores an operating system 252, such as DRAWIN, RTXC, LINUX, iOS, UNIX, OS X, WINDOWS, or an embedded operating system such as VXWorkS. The operating system 252 can include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. The memory 250 may also include multimedia conference call managing instructions 274 to facilitate conference call related processes and instructions.

In some embodiments, the communication instructions 254 may include software applications to facilitate connection with the communication server 150 that hosts a messaging communication session among a group of participants. The electronic messaging instructions 262 may include a software program that facilitates a participant associated with the user device to receive notification of new messages exchanged in a communication group and subjects designated to each message from the communication server 150. Further, the electronic messaging instructions 262 may include software applications for a participant associated with the user device to edit a subject of one or more messages in the notification and facilitate sending the subject to the communication server 150. The graphical user interface (GUI) instructions 256 may include a software program that facilitates display of the received notification and facilitates a participant associated with the user device to provide user input, and so on. The graphical user interface instructions 256 may also include a software program that causes messages in the notification to be displayed based on subjects designated to the messages. For example, messages designated as the same subject may be displayed in the same color, and messages designated as a different subject may be displayed in a different color. As another example, for each subject in the notification, a separate window may be displayed to contain messages designated to that subject. As another example, for each subject in the notification, a separate part of the window is used to display messages designated to that subject, such as using vertical lines, horizontal lines or diagonal (45 degree) separation lines to distinguish different subjects.

Each of the above identified instructions and applications may correspond to a set of instructions for performing one or more functions described above. These instructions need not be implemented as separate software programs, procedures, or modules. The memory 250 may include additional instructions or fewer instructions. Furthermore, various functions of the user device 200 may be implemented in hardware and/or in software, including in one or more signal processing and/or application specific integrated circuits.

Figure 3:
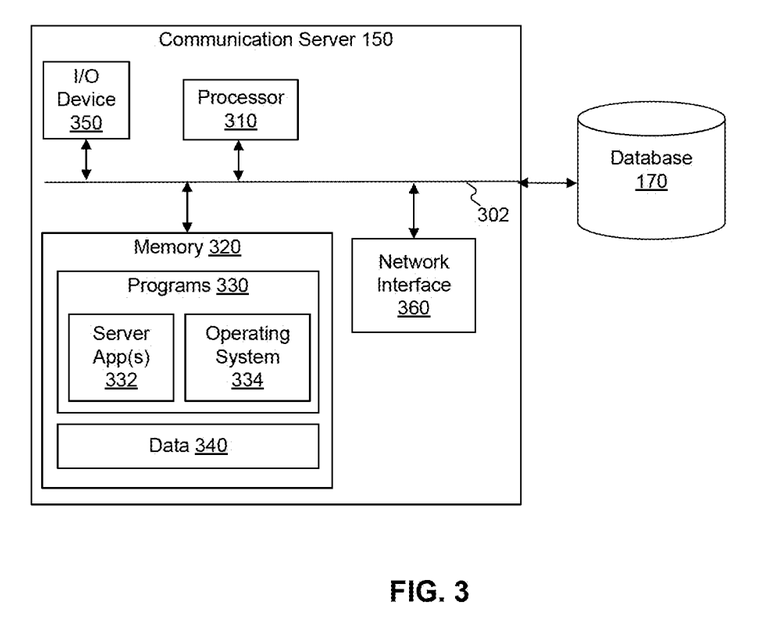
FIG. 3 is a diagram of an example communication server, consistent with the disclosed embodiments.

FIG. 3 shows a diagram of an example communication server 150, consistent with the disclosed embodiments. The communication server 150 may be implemented as a specially made machine that is specially programed to perform functions relating to providing notifications of newly received messages for a user of a collaborative communication system. The special programming at the communication server 150 enables the communication server to receive a plurality of messages from devices associated with users of the collaborative communication system, identify subjects associated with the messages, and provide a notification including the plurality of messages to a device associated with a recipient based on the identified subjects.

The communication server 150 includes a bus 302 (or other communication mechanism) which interconnects subsystems and components for transferring information within the communication server 150. As shown, the communication server 150 may include one or more processors 310, input/output ("I/O") devices 350, network interface 360 (e.g., a modem, Ethernet card, or any other interface configured to exchange data with a network), and one or more memories 320 storing programs 330 including, for example, server app(s) 332, operating system 334, and data 340, and can communicate with an external database 170 (which, for some embodiments, may be included within the communication server 150). The communication server 150 may be a single server or may be configured as a distributed computer system including multiple servers, server farms, clouds, or computers that interoperate to perform one or more of the processes and functionalities associated with the disclosed embodiments.

The processor 310 may be one or more processing devices configured to perform functions of the disclosed methods, such as a microprocessor manufactured by Intel™ or manufactured by AMD™. The processor 310 may comprise a single core or multiple core processors executing parallel processes simultaneously. For example, the processor 310 may be a single core processor configured with virtual processing technologies. In certain embodiments, the processor 310 may use logical processors to simultaneously execute and control multiple processes. The processor 310 may implement virtual machine technologies, or other technologies to provide the ability to execute, control, run, manipulate, store, etc. multiple software processes, applications, programs, etc. In some embodiments, the processor 310 may include a multiple-core processor arrangement (e.g., dual, quad core, etc.) configured to provide parallel processing functionalities to allow the communication server 150 to execute multiple processes simultaneously. It is appreciated that other types of processor arrangements could be implemented that provide for the capabilities disclosed herein.

The memory 320 may be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The communication server 150 may include one or more storage devices configured to store information used by processor 310 (or other components) to perform certain functions related to the disclosed embodiments. For example, the communication server 150 includes memory 320 that includes instructions to enable the processor 310 to execute one or more applications, such as server apps 332, operating system 334, and any other type of application or software known to be available on computer systems. Alternatively or additionally, the instructions, application programs, etc. are stored in an external database 170 (which can also be internal to the communication server 150) or external storage communicatively coupled with the communication server 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 320 and database 170 may include one or more memory devices that store data and instructions used to perform one or more features of the disclosed embodiments. The memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the communication server 150 may be communicatively connected to one or more remote memory devices (e.g., remote databases (not shown)) through network 140 or a different network. The remote memory devices can be configured to store information that the communication server 150 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 330 include one or more software modules causing processor 310 to perform one or more functions of the disclosed embodiments. Moreover, the processor 310 may execute one or more programs located remotely from one or more components of the collaborative communication system 100. For example, the communication server 150 may access one or more remote programs that, when executed, perform functions related to disclosed embodiments.

In the presently described embodiment, server app(s) 332 causes the processor 310 to perform one or more functions of the disclosed methods. For example, the server app(s) 332 may cause the processor 310 to receive a plurality of messages from one or more devices associated with one or more users, identify one or more subjects associated with the plurality of messages, and provide a notification including the plurality of messages to a device associated with a recipient, where the plurality of messages are arranged in the notification based on the identified one or more subjects. In some embodiments, other components of the collaborative communication system 100 may be configured to perform one or more functions of the disclosed methods. For example, user devices 120A-120E may be configured to host a communication session for a communication group and identify subjects associated with a plurality of messages exchanged in the communication session. As another example, user devices 120A-120E may be configured to provide a notification including the plurality of messages to a device associated with a participant of the communication group.

In some embodiments, the program(s) 330 may include the operating system 334 performing operating system functions when executed by one or more processors such as the processor 310. By way of example, the operating system 334 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, disclosed embodiments may operate and function with computer systems running any type of operating system 334. The communication server 150 may also include software that, when executed by a processor, provides communications with network 140 through the network interface 360 and/or a direct connection to one or more user devices 120A-120E.

In some embodiments, the data 340 includes, for example, user profiles of participants of the communication group and historical communications optionally coupled with any communication content between or associated with the users. The data 340 may also include timestamps associated with each message in a communication session of a communication group. For example, the data 340 may include instant messages sent by the participants of a communication group, and the time each message is written, sent, read, and/or received.

The communication server 150 may also include one or more I/O devices 350 having one or more interfaces for receiving signals or input from devices and providing signals or output to one or more devices that allow data to be received and/or transmitted by the communication server 150. For example, the communication server 150 may include interface components for interfacing with one or more input devices, such as one or more keyboards, mouse devices, and the like, that enable the communication server 150 to receive input from an operator or administrator (not shown).

Figure 4:
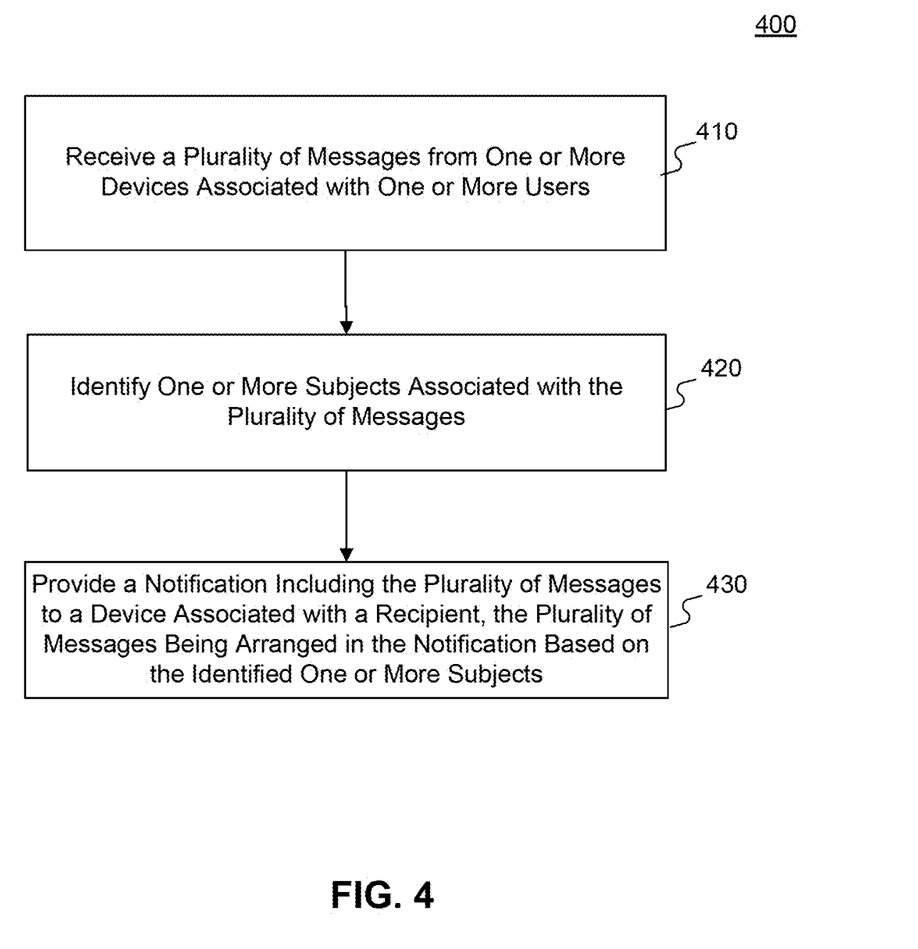
FIG. 4 is a flowchart of an example process for providing a notification, in accordance with embodiments of the present disclosure.

FIG. 4 is a flowchart of an example process 400 for providing a notification, in accordance with embodiments of the present disclosure. The steps associated with this example process may be performed by, for example, a processor of the communication server 150 of FIG. 1. The order of steps is optional. The example process 400 allows a user of a collaborative communication system to receive notifications of newly received messages based on subjects of the messages, thereby facilitating the user's appreciation of the context of the messages in the notifications.

In step 410, the communication server receives a plurality of messages from one or more devices associated with one or more users. The users may be members of a communication group in a collaborative communication system, where the users exchange messages with one another in real-time via the collaborative environment. The plurality of messages may contain text, audio, video, data, or any other multimedia content. In some implementations, the plurality of messages are time-stamped based on a time when each message is transmitted or received.

In step 420, the communication server identifies one or more subjects associated with the plurality of messages. In some implementations, the communication server may identify which messages belong to the same subject and differentiate among a plurality of subjects reflected in the plurality of messages, without identifying the subjects contained in the messages. In other implementations, the communication server may identify the subject each of the plurality of messages is relating to, in addition to identifying which messages belong to the same subject.

In some embodiments, the communication server may use machine learning techniques to determine what subject is being discussed in each of the plurality of messages. For example, the amount of message data increases with messages exchanged in a communication session, and it becomes easier to determine keywords to improve determining a suitable subject to messages in the communication session. As another example, if a new message arrives from a user who is assigned as a role of a watcher, i.e., a security guard in the communication group, it is likely that new subject is started. Machine learning techniques known by persons skilled in the art may be used to identify subjects in the plurality of messages without departing the scope of the present disclosure.

In some embodiments, the communication server may identify subjects in the messages based on the identified keywords contained in the messages. Keyword detection methods known by persons skilled in the art may be used to identify subjects in the plurality of messages without departing the scope of the present disclosure. In some implementations, if one or more identical keywords are contained in some of the messages, the communication server may determine that it is likely that these messages relate to the same subject.

In some embodiments, the communication server may identify subjects in the messages based on direct user inputs. For example, when typing a message, a user may also enter or select a subject associated with the message (e.g., using hashtags, @mentions, etc.) in a user device associated with the user. The communication server may detect the subject of the message based on the user input. In some embodiments, the communication server may identify subjects in the messages based on an assigned task, such as a message initiated from a task tracking software.

In some embodiments, the communication server may identify subjects in the messages based on a timestamp associated with each message. For example, the communication server may determine whether the messages belong to the same subject based on a time period between the messages. The communication server may determine that the messages belong to different subjects if the time period between the messages is greater than a predetermined threshold. In some implementations, the communication server 150 may determine the time period between a first message sent earlier by a first user and a second message sent later by a second user as the time period between the time a first message is read by the second user and the time the second user starts to write the second message. The reason is that there is a high likelihood that the second message relates to the same subject as the first message when the second user starts typing the second message right after reading the first message from the first user.

In some embodiments, when multiple techniques are used to identify subjects in the plurality of messages, the communication server may combine results generated by the various techniques with predetermined weights. For example, a predetermined weight may be assigned to each subject identification technique. The predetermined weight for each subject identification technique may vary depending on the application scenarios. For example, the above-discussed timestamp method may be assigned a dominate weight in one scenario, while the above-discussed keyword method may be assigned a dominate weight in another scenario. In some embodiments, the communication server may first check keywords associated with the messages for identifying the likely subjects, and use timestamps associated with the messages to determine the subjects when the messages are identified to be associated with two or more subjects.

In step 430, the communication server provides the notification including the plurality of messages to a device associated with a recipient. In one implementation, the plurality of messages may be arranged in the notification based on the identified one or more subjects. This arrangement may be done separately, for example, although it is shown in step 430 in accordance with one implementation. The recipient may belong to the same communication group as the one or more users and exchange messages with the one or more users in a collaborative environment. The recipient may be currently logged off the collaborative communication system at the moment when the one or more users send the plurality of messages in the collaborative communication system. The device associated with the recipient may display the notification including the plurality of messages based on the identified one or more subjects associated with the messages.

In some embodiments, the device may display the messages associated with different subjects in different sections in the notification. For example, a first group of messages relating to a first subject are placed in a first section in the notification, and a second group of messages relating to a second subject are placed in a second section in the notification. As another example, the messages corresponding to the different subjects may be separated by diagonal (e.g., 45 degree) separation lines.

In some embodiments, the device may display messages belonging to different subjects in different colors, such that the recipient may easily differentiate messages for different subjects. In some embodiments, the device may display messages belonging to different subjects in a tree structure. For example, messages corresponding to different subjects may be placed in different nodes of the tree, and messages corresponding to different sub-topics within the same subject may be placed in different child nodes under the same parent node representing the common subject.

In some embodiments, the device provides an interface to allow the recipient to switch the display of notification between a regular mode in which messages are displayed with no subject differentiation and a subject mode in which messages are displayed with the subject differentiation. In some embodiments, the device provides an interface to allow the recipient to configure the notification to hide messages corresponding to certain subjects in the notification and cause those messages to be hidden in the display.

In some embodiments, the notification includes the identified subjects corresponding to the plurality of messages and, for each subject, indicates a group of messages corresponding to that subject. In other embodiments, the notification indicates which messages belong to the same subject without identifying the subjects corresponding to the messages, and messages corresponding to the same subject may be grouped together in the display.

In some embodiments, the communication server may search different communication groups and include in the notification messages from external sources that are relevant to the identified subjects. For example, the one or more users and the recipient may belong to a first communication group, and one of the identified subjects in the plurality of messages sent by the one or more users relates to an international conference on software engineering. The communication server may detect that members of a second communication group are discussing the same subject and provide in the notification messages relating to the international conference on software engineering exchanged by members in the second communication group. In some implementations, the communication server may first obtain permission from members of the second communication group before providing the messages exchanged in the second communication group in the notification to the recipient.

In some embodiments, the communication server may identify an external source associated with one of the identified subjects and provide a web link associated with the external source in the notification. The external source may not be a part of the collaborative environment used for exchanging messages between the one or more users and the recipient. For example, the communication server may identify that the plurality of messages relate to a software development issue tracked by Jira and provide in the notification a link to the Jira project page. In some implementations, the external source may be a part of the collaborative environment used for exchanging messages between the one or more users and the recipient. For example, the communication server may identify that the plurality of messages relate to a document shared by one of the users in the collaborative environment and provide in the notification a link to the shared document.

In some embodiments, the communication server may identify messages in past communications that are pertinent to one of the identified subjects and include the messages in past communications in the notifications sent to the recipient. The messages in past communications have already been received by the recipient in the past, and providing those past messages in the notification facilitates the recipient to understand the context of the newly received messages. For example, the communication server may identify that some of the newly received messages relate to a particular software development project and provide messages exchanged in the past relating to the particular software development project in the notification. In doing so, the recipient may be mindful of the communications happened in the past on this subject for a good understanding of the context of the newly received messages. In some implementations, the device associated with the recipient may provide an interface for the recipient to select whether to receive past communications relating to the same subjects in the notification of new messages. The interface may also allow the recipient to select the time period for the past communications to show in the notification, such as 3 days, 7 days, and so on.

In some embodiments, the communication server may identify that the newly received messages relate to a task assigned to the recipient and provide a taskbar in the notification indicating a progress of the task. For example, some of the newly received messages may relate to the task of updating the product roadmap, and the recipient is one of the assignees of the task. The communication server may then provide a taskbar in the notification indicating that a current progress of the task, such as 10% completed. The communication server may also provide a due date of the task and name(s) of the assignee(s) in the notification. In some embodiments, the communication server may identify messages in the past that relate to the task assignment and include those messages in the notification. For example, when some of the newly received messages relate to the task of updating the product roadmap, the communication server may include the past message creating the task and past messages from assignees updating the progress of the task in the notification. In another embodiment, the communication server can determine related messages in other applications. For example, when there is an email thread related to the same question, the server can provide messages from the email thread in the notification or attach the email thread to the notification.

In some embodiments, some or all of the steps in the process 400 may be performed by a user device, such as the user devices 120A-120E of FIG. 1. For example, the user device may be configured to receive a plurality of messages from one or more devices associated with one or more users, identify one or more subjects associated with the plurality of messages, and/or provide a notification including the plurality of messages to a device associated with a recipient, where the plurality of messages are arranged in the notification based on the identified one or more subjects.

Figure 5:
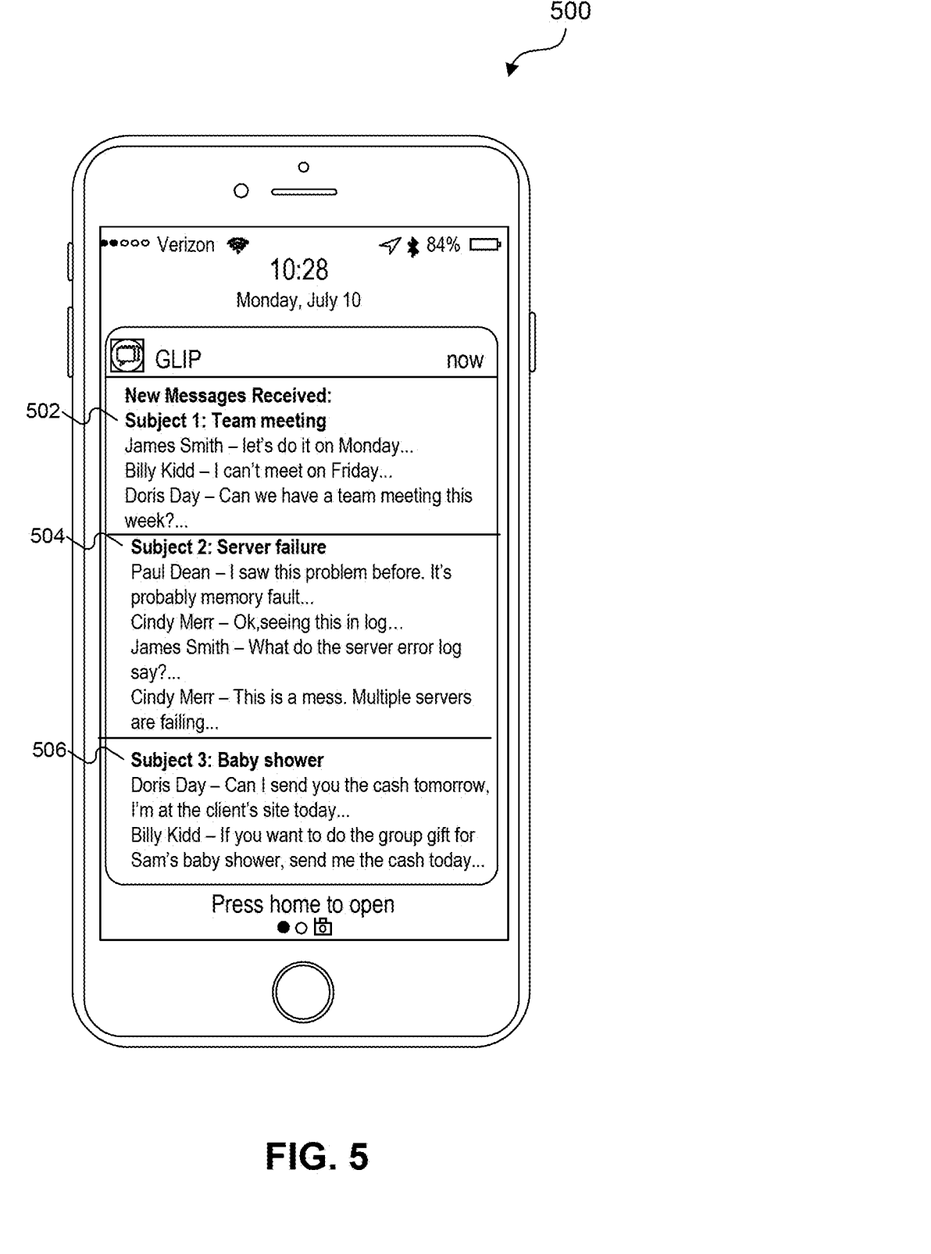
FIG. 5 is an example notification for a plurality of messages, in accordance with embodiments of the present disclosure.

FIG. 5 illustrates an example notification 500 for a plurality of messages, in accordance with embodiments of the present disclosure. The plurality of messages are exchanged in a collaborative environment when a recipient is logged out of the collaborative environment, and the notification 500 for the plurality of messages is displayed in a device associated with the recipient. As shown in FIG. 5, the new messages correspond to three identified subjects 502, 504, and 506, i.e., team meeting, server failure, and baby shower. The new messages are organized in the notification 500 based on the three identified subjects, where messages corresponding to the same subjects are grouped together, and messages corresponding to different subjects are displayed in different parts of the notification. In this example, the identified subjects 502, 504, and 506 for each of the newly received messages are also provided in the notification. In other implementations, while messages corresponding to the same subjects are grouped together in the notification, the subjects for each of the newly received messages may not be provided in the notification. FIG. 5 serves as an example of presenting the notification based on the subjects of the new messages, and the present disclosure does not intend to limit the way the notification is displayed based on the subjects of the messages.

Figure 6:
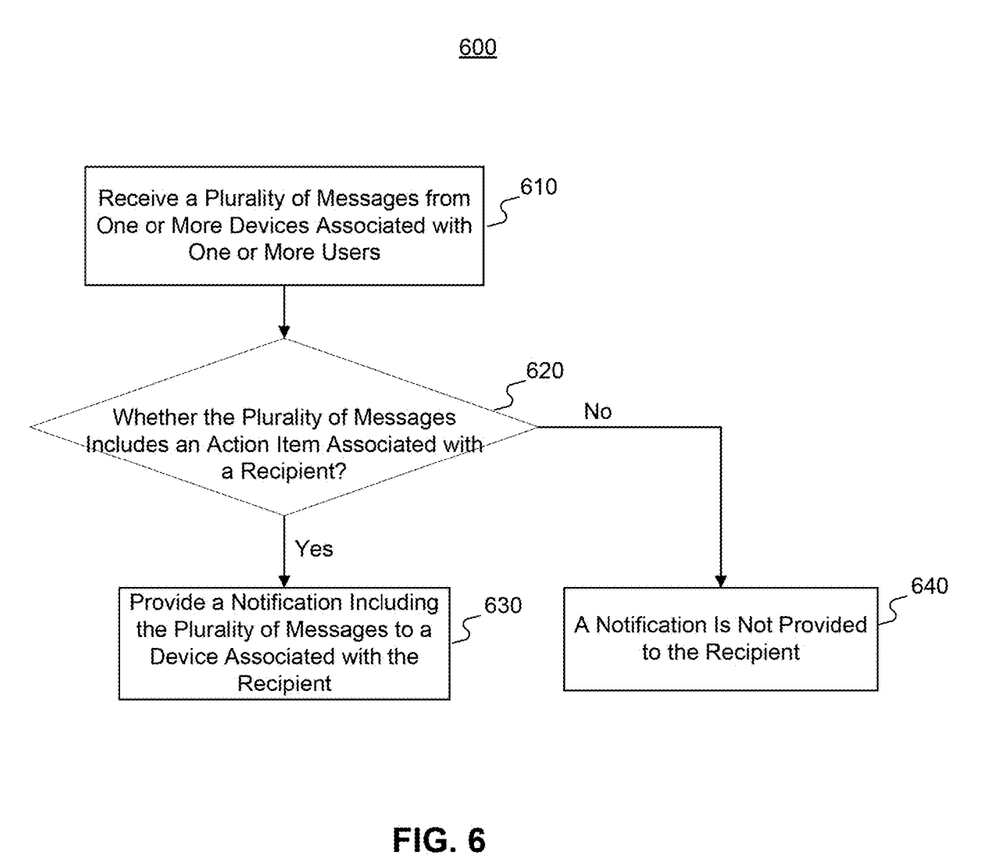
FIG. 6 is a flowchart of another example process for providing a notification, in accordance with embodiments of the present disclosure.

FIG. 6 is a flowchart of an example process 600 for providing a notification, in accordance with embodiments of the present disclosure. The steps associated with this example process may be performed by, for example, a processor of the communication server 150 of FIG. 1. The example process 600 allows a user of a collaborative communication system to receive notifications of newly received messages when an action item is included in the messages and to take appropriate action within the notification when an action item is pending for the user.

In step 610, the communication server receives a plurality of messages from one or more devices associated with one or more users. The users may be members of a communication group in a collaborative communication system, where the users exchange messages with one another in real-time via the collaborative environment. The plurality of messages may contain text, audio, video, data, or any other multimedia content.

In step 620, the communication server identifies whether the plurality of messages includes an action item associated with a recipient. The recipient may belong to the same communication group as the one or more users and exchange messages with the one or more users in a collaborative environment. The recipient may be currently logged off the collaborative communication system at the moment when the one or more users send the plurality of messages in the collaborative communication system. The action item may be any item pending for the recipient's action, such as an invitation for the recipient to attend a meeting, a confirmation request for the recipient to confirm, an approval request for the recipient to approve, a task assignment for the recipient to complete, and so on.

In step 630, if the plurality of messages includes an action item associated with a recipient, the communication server provides a notification including the plurality of messages to a device associated with the recipient. In some embodiments, the notification may include the action item and an interface for the recipient to act on the action item. For example, when the newly received messages include a purchase order request for the recipient to approve, the notification may include a selectable button of "approve" and a selectable button of "reject" for the recipient to act on the purchase order request. In some implementations, the notification may also include an input field for the recipient to enter comments associated with the action taken on the action item. For example, when the newly received messages include a purchase order request for the recipient to approve, the notification may also include an input field below the selectable buttons of "approve" and "reject" to allow the recipient to enter comments.

In step 640, if the plurality of messages does not include an action item associated with a recipient, the communication server determines that a notification is not provided to the recipient. In this embodiment, notifications are only sent to the recipient when the communication server detects there are action items for the recipient to consider. By only sending notifications when there are action items for the recipient to consider, the recipient may be alerted that an action item is pending for his action whenever a notification is received in the device associated with the recipient. In some implementations, the device associated with the recipient may provide an interface for the recipient to select whether to receive notifications of new messages if the new messages do not include an action item associated with a recipient. The interface may also allow the recipient to select particular action items to trigger the notification. For example, the interface may allow the recipient to select whether to receive notifications when the new messages include action item(s) of approval request, meeting invitation, task assignment, or the like.

In some embodiments, some or all of the steps in the process 600 may be performed by a user device, such as the user devices 120A-120E of FIG. 1. For example, the user device may be configured to receive a plurality of messages from one or more devices associated with one or more users, identify whether the plurality of messages includes an action item associated with a recipient, provide a notification when the plurality of messages includes an action item associated with the recipient, and/or determine that a notification is not provided to the recipient when the plurality of messages does not include an action item associated with the recipient.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A collaborative communication system, comprising:
a memory; and
at least one processor configured to:
receive a set of messages in the collaborative communication system;
determine that a recipient is not participating in exchanging the set of messages;
identify that the set of messages includes an action item associated with the recipient, wherein the action item includes a request for the recipient to act on an item;
provide a notification to the recipient when the set of messages includes the action item associated with the recipient;
receive a second set of messages from the one or more devices, wherein the second set of messages corresponds to a first subject and a second subject, the second set of messages includes a first group of messages relating to the first subject and a second group of messages relating to the second subject; and
provide a second notification to the recipient, wherein the first group of messages are placed in a first section in the second notification, and the second group of messages are placed in a second section in the second notification.

2. The system of claim 1, wherein the action item includes at least one of the following:
an invitation to attend a meeting;
a confirmation request;
an approval request; and
a task assignment.

3. The system of claim 1, wherein the set of messages include one or more subjects and are exchanged between participants of a first communication group, and wherein the at least one processor is further configured to:
detect one or more messages exchanged between participants of a second communication group, the one or more messages including at least one of the one or more subjects; and
provide the one or more messages in the notification.

4. The system of claim 1, wherein the at least one processor is further configured to:
identify an external source associated with at least one or more subjects, wherein the external source is not a part of the collaborative environment; and
provide a web link associated with the external source in the notification.

5. The system of claim 1, wherein the set of messages are exchanged between participants of a communication group, and wherein the at least one processor is further configured to:
identify one or more messages associated with at least one or more subjects, wherein the one or more messages are transferred between a plurality of participants of the communication group prior to the set of messages being received; and
provide the one or more messages in the notification.

6. The system of claim 5, wherein the one or more messages includes a task assigned to the recipient, and the notification includes a taskbar indicating a progress of the task.

7. A computer-implemented method for providing notifications for a set of messages, comprising:
receiving a set of messages in the collaborative communication system;

determining that a recipient is not participating in exchanging the set of messages;
identifying that the set of messages includes an action item associated with the recipient, wherein the action item includes a request for the recipient to act on an item; and
providing a notification to the recipient when the set of messages includes the action item associated with the recipient;
receiving a second set of messages from the one or more devices, wherein the second set of messages corresponds to a first subject and a second subject, the second set of messages includes a first group of messages relating to the first subject and a second group of messages relating to the second subject; and
providing a second notification to the recipient, wherein the first group of messages are placed in a first section in the second notification, and the second group of messages are placed in a second section in the second notification.

8. The computer-implemented method of claim 7, wherein the collaborative communication system is accessible through a web browser.

9. The computer-implemented method of claim 7, wherein the set of messages include one or more subjects and are exchanged between participants of a first communication group, the computer-implemented method further comprising:
detecting one or more messages exchanged between participants of a second communication group, the one or more messages including at least one of the one or more subjects; and
providing the one or more messages in the notification.

10. The computer-implemented method of claim 7, further comprising:
identifying an external source associated with at least one of the one or more subjects, wherein the external source is not a part of the collaborative environment; and
providing a web link associated with the external source in the notification.

11. The computer-implemented method of claim 7, wherein the set of messages are exchanged between participants of a communication group, the computer-implemented method further comprising:
identifying one or more messages associated with at least one or more subjects, wherein the one or more messages are transferred between a plurality of participants of the communication group prior to the set of messages being received; and
providing the one or more messages in the notification.

12. The computer-implemented method of claim 11, wherein the one or more messages includes a task assigned to the recipient, and the notification includes a taskbar indicating a progress of the task.

13. A non-transitory computer-readable medium that stores a set of instructions that is executable by at least one processor of a server to cause the server to perform a method for providing notifications for a set of messages, the method comprising:
receiving a set of messages in the collaborative communication system;
determining that a recipient is not participating in exchanging the set of messages;
identifying that the set of messages includes an action item associated with the recipient, wherein the action item includes a request for the recipient to act on an item; and
providing a notification to the recipient when the set of messages includes the action item associated with the recipient;
receiving a second set of messages from the one or more devices, wherein the second set of messages corresponds to a first subject and a second subject, the second set of messages includes a first group of messages relating to the first subject and a second group of messages relating to the second subject; and
providing a second notification to the recipient, wherein the first group of messages are placed in a first section in the second notification, and the second group of messages are placed in a second section in the second notification.

14. The non-transitory computer-readable medium of claim 13, wherein the action item includes at least one of the following:
an invitation to attend a meeting;
a confirmation request;
an approval request; and
a task assignment.

15. The non-transitory computer-readable medium of claim 13, wherein the set of messages include one or more subjects and are exchanged between participants of a first communication group, the computer-readable medium storing a set of further instructions that is executable by the at least one processor to cause the server to perform:
detecting one or more messages exchanged between participants of a second communication group, the one or more messages including at least one of the one or more subjects; and
providing the one or more messages in the notification.

16. The non-transitory computer-readable medium of claim 13, storing a set of further instructions that is executable by the at least one processor to cause the server to perform:
identifying an external source associated with at least one of the one or more subjects, wherein the external source is not a part of the collaborative environment; and
providing a web link associated with the external source in the notification.

17. The non-transitory computer-readable medium of claim 13, wherein the set of messages are exchanged between participants of a communication group, the computer-readable medium storing a set of further instructions that is executable by the at least one processor to cause the server to perform:
identifying one or more messages associated with at least one or more subjects, wherein the one or more messages are transferred between a plurality of participants of the communication group prior to the set of messages being received; and
providing the one or more messages in the notification.

* * * * *